United States Patent Office 2,868,315
Patented Jan. 13, 1959

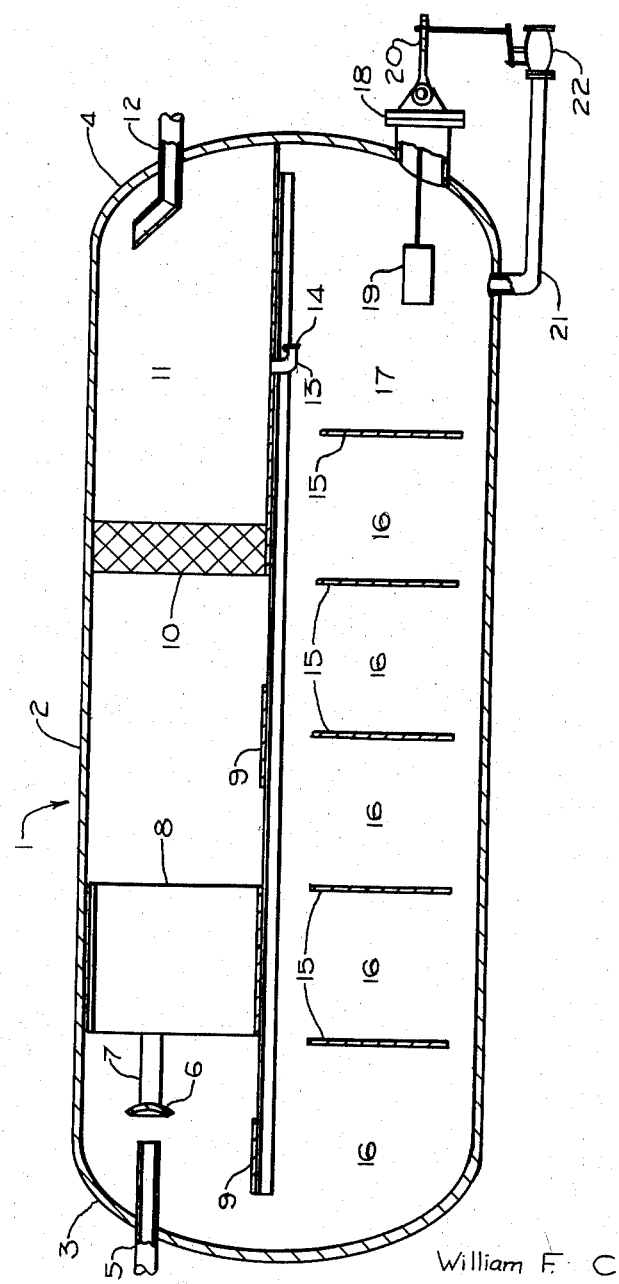

2,868,315

APPARATUS FOR SEPARATING FLUIDS

William F. Chaple and Robert E. McMinn, Oklahoma City, Okla., assignors to Black, Sivalls & Bryson, Inc., Kansas City, Mo., a corporation of Delaware Application May 24, 1957, Serial No. 661,493

1 Claim. (Cl. 183—2.7)

The present invention relates generally to an apparatus for separating the liquid and gaseous components of a fluid stream and in particular to an apparatus for separating oil and gas from an oil and gas well stream which has foaming tendencies.

Prior to the present invention the separation of gas and oil of an oil and gas well stream was complicated when the oil began to foam. The separation of foaming oil requires special design of separation equipment since the foam will pass through and flood out mist extraction elements and almost always will cause the carryover of the foaming oil through the gas outlet. Thus, the breakdown of foaming oil generally requires large volume vessels or other complicated apparatus. The primary object of the present invention is to provide a simple and effective apparatus for separating oil and gas when such components foam.

A further object of the present invention is to provide a novel oil and gas separator to handle foaming oil.

A still further object is to provide an oil and gas separator which will retain oil foam until it has been broken.

In accomplishing these and other objects of the present invention, we have provided apparatus illustrated in the accompanying drawing wherein:

The figure is a sectional view of an apparatus constructed in accordance with the present invention.

Referring more in detail to the drawing:

Separator 1 is shown to be formed from horizontally disposed cylindrical shell 2 and dished heads 3 and 4. Inlet 5 extends through head 3 into the upper interior portion of separator 1. The influent fluids flowing into separator 1 are deflected by baffle 6 which is supported by bracket 7. Straightening vanes 8 reduce the turbulent gas flow caused by baffle 6 and also support bracket 7. Horizontal baffles or partitions 9 are spaced along the length of separator 1.

The gas free of all but entrained mist flows from vanes 8 through mist extraction element 10 into gas collection zone 11. Gas outlet duct 12 extends from within gas collection zone 11 through head 4. Gas collection zone 11 is defined by mist extraction element 10, baffle 9 and the inner surfaces of shell 2 and head 4. Drain 13 extends from within gas collection zone 11, through baffles 9 and is provided with a swing check valve 14 to prevent the flow of gas through drain 13 into gas collection zone 11, thereby preventing the bypassing of mist extraction element 10.

Vertical transverse partitions 15 are positioned across the lower portion of vessel 2 and are spaced apart to provide a plurality of foam settling zones 16 and oil collection zone 17. Also, it should be noted that partitions 15 are spaced a short distance from the lower inner surface of shell 2 to provide a passageway for oil flow between foam settling zones 16 and into oil collection zone 17.

Float flange connection 18 extends through head 4 into oil collection zone 17. Float 19 is connected through connection 18 to adjustable linkage 20. Oil outlet duct 21 extends from the lower portion of oil collection zone 17 out through shell 2 and to valve 22. Valve 22 is connected to linkage 20 and therefore is controlled by float 19.

In operation, the influent oil and gas stream flows through inlet 5 and is deflected by baffle 6 so that the majority of liquids will drain to and collect in the lower portion of separator 1. The gas with a small amount of entrained liquid in the form of mist then flows through straightening vanes 8 and mist extraction element 10 where the remaining liquid is removed from the gas. The separated gas is then discharged from gas collection zone 11 through gas outlet duct 12 under the control of a gas back pressure valve (not shown).

The liquids in the influent stream are deflected by baffle 6 into contact with the inner surface of separator 1 and the upper surfaces of baffles 9 and will drain into the lower portion of separator 1. These separated liquids will flow under transverse partitions 15 and will be discharged from oil collection zone 17 through oil outlet duct 21. Float 19 is connected through adjustable linkage to valve 22 to maintain a liquid level in oil collection zone 17 substantially above the lower extremities of transverse partitions 15 and also substantially below the upper extremities of transverse partitions 15.

When the oil flowing into separator 1 has a tendency to foam, the present invention as shown in the figure will handle the oil foam, effectively separating the oil from the gas. The foam together with the liquids free of gas will be deflected by baffle 6 and will drain into the first foam settling zone 16. The foam is retained in foam settling zones 16 by virtue of the particular construction of transverse partitions 15, the liquid level maintained in separator 1 by float 19 and the position of baffles 9. Each of the foregoing factors contributed substantially to the effective retention of foam in foam settling zones 16 and the effective breaking down of the foam. From Fig. 1 it may be seen that additional foam may spill over into the second and third foam settling zones 16 but unless foaming is so severe that the whole of separator 1 fills with foam, the foam will be retained in foam settling zones 16 until the gas is liberated therefrom allowing the oil to settle. Only oil will flow under transverse partitions 15 since the liquid level in oil collection zone 17 will be maintained sufficiently high to maintain a separated oil level above the lower extremity of each transverse partition 15 in each foam settling zone 16. This is possible since even though the level of the foam may rise substantially above the liquid level, it will not depress the liquid level below partition 15 since the foam (bubbles of gas in oil) will be many times lighter than the separated oil. Thus, transverse partitions 15 will cause foam to be retained in foam settling zones 16 until broken. Horizontal baffles 9 function to minimize the flow of gas in the lower portion of separator 1, thereby minimizing the disturbance of foam collecting in foam settling zones 16.

Thus, we have provided a novel apparatus for separating the oil and gas from oil foam. Also, we have provided a novel apparatus which retards the flow of oil foam therethrough until the foam has been broken. This is accomplished by utilizing a plurality of foam settling zones which are protected from any substantial amount of gas turbulence.

What we claim and desire to secure by Letters Patent is:

An oil and gas separator comprising, a horizontally disposed cylindrical vessel having an inlet end and an outlet end, an inlet into the inlet end of said vessel, an inlet baffle, said inlet directed toward said baffle, a plurality of horizontally disposed divider plates positioned across said vessel, one of said divider plates defining the lower surface of a gas collecting chamber, a mist extraction element positioned across the entrance to said gas collecting chamber, straightening vanes positioned between said inlet baffle and said mist extraction element, a gas outlet extending from said gas collecting chamber through the outlet end of said vessel, a plurality of vertically disposed transverse partitions positioned across the lower portion of said vessel, the lower edges of said partitions each being spaced a short distance above the lower portion of said vessel, the upper edges of said partitions being spaced a short distance below said divider plates and a liquid outlet from the lower portion of said outlet end of said vessel, said liquid outlet being positioned downstream of all of said transverse partitions.

References Cited in the file of this patent

UNITED STATES PATENTS

| | | |
|---|---|---|
| 2,614,648 | Wilson | Oct. 21, 1952 |
| 2,657,760 | Glasgow | Nov. 3, 1953 |